United States Patent
Hamer et al.

(10) Patent No.: US 6,858,666 B2
(45) Date of Patent: Feb. 22, 2005

(54) ORGANOGEL PARTICLES

(75) Inventors: Monica A. Hamer, Woodbury, MN (US); William A. Hendrickson, Stillwater, MN (US); Gordon R. Pryor, Mendota Height, MN (US)

(73) Assignee: Aveka, Inc., Woodbury, MN (US)

( * ) Notice: Subject to any disclaimer, the term of this patent is extended or adjusted under 35 U.S.C. 154(b) by 133 days.

(21) Appl. No.: 10/090,337

(22) Filed: Mar. 4, 2002

(65) Prior Publication Data

US 2003/0165681 A1 Sep. 4, 2003

(51) Int. Cl.$^7$ .......................... C08K 5/01; C08K 91/00
(52) U.S. Cl. .................. 524/474; 523/333; 525/50; 525/416; 524/476; 524/487; 524/700; 524/764
(58) Field of Search .................. 428/402, 407; 523/333; 524/474, 476, 487, 81, 700, 764; 525/50, 416

(56) References Cited

U.S. PATENT DOCUMENTS

| | | | |
|---|---|---|---|
| 2,200,709 A * | 5/1940 | Trommsdorff | 524/560 |
| 3,959,540 A | 5/1976 | Leiberich et al. | 428/35 |
| 4,055,554 A | 10/1977 | Helmstetter | 260/117 |
| 4,350,679 A | 9/1982 | Mizuno et al. | 424/38 |
| 4,446,165 A * | 5/1984 | Roberts | 426/602 |
| 4,804,542 A | 2/1989 | Fischer et al. | 424/456 |
| 4,816,259 A | 3/1989 | Matthews et al. | 424/463 |
| 5,433,953 A | 7/1995 | Tsuei et al. | 424/489 |
| 5,554,385 A | 9/1996 | Stroud | 424/456 |
| 5,589,194 A | 12/1996 | Tsuei et al. | 424/497 |
| 6,004,580 A * | 12/1999 | Backlund et al. | 424/450 |
| 6,042,815 A * | 3/2000 | Kellner et al. | 424/63 |
| 6,103,269 A | 8/2000 | Wunderlich et al. | 424/489 |
| 6,270,836 B1 | 8/2001 | Holman | 427/126.3 |
| 6,342,238 B1 * | 1/2002 | Simonnet et al. | 424/401 |
| 6,361,765 B1 * | 3/2002 | Emslie et al. | 424/65 |
| 6,572,892 B1 | 6/2003 | Ioulalen et al. | 424/489 |

OTHER PUBLICATIONS

Deaton, "Low Molecular Weight Bis–Urea Organogelators", Feb. 21, 2002, pp. 9–16.*

* cited by examiner

*Primary Examiner*—H. Thi Le
(74) *Attorney, Agent, or Firm*—Mark A. Litman & Associates, P.A.

(57) ABSTRACT

A method forms self-sustaining particles that comprise a hydrophobic (oleophilic) phase in particulate form, with no need for a rigid shell to encapsulate the phase, and usually with no shell present. The oleophilic phase contains a gelation agent, and preferably an organogelation agent. The particles may be stored alone or in a minor amount (e.g., less than 40% by volume) of water to assist their stability and act as a barrier against their coalescence. These water-separated compositions are not necessarily dispersions or suspensions, but may be merely particles in an aqueous storage environment. The particles have prolonged stability and can be readily, simply, and inexpensively formed. A simple method of manufacture comprises forming a solution of the ingredients (e.g., at least the oleophilic material and gelation agent) at a temperature above their gelation temperature, forming droplets or molten, or liquid or flowable particles of the solutions, and cooling the droplets to form the particulates. Cooling may be effected by exposure to ambient conditions (e.g., room temperature) when the ingredients are properly selected, or an actual cooling environment may be needed.

16 Claims, No Drawings

ID

ORGANOGEL PARTICLES

BACKGROUND OF THE INVENTION

1. Field of the Invention

The present invention relates to particles, particularly small particles of less than 10 millimeters or less than 5 millimeters, and particles carrying oleophilic materials with low weight percentages of solid, particulate-supporting material, and particularly particles functioning as high oleophilic content organogels.

2. Background of the Art

It is often desirable to provide materials into general media or onto surfaces in particulate form. Particles also provide a very efficient method of adding concentrations of physical or chemical additives into diverse systems. Typical vehicles for these types of additions include solid homogeneous particles of material, microcapsules, bubbles, beads, ground particulates, uniform particulates, and the like.

U.S. Pat. No. 6,270,836 describes microcapsules coated with a gel, specifically a gel produced by the sol-gel process. The gel coating provides certain resistances to the microcapsules, resulting in enhanced protection for their contents.

Microcapsules containing different types of materials are known, as are microencapsulation techniques to prepare such materials, which are used as starting materials in the process of this invention. Microcapsules can be used in many applications in which materials are to be contained either indefinitely or temporarily.

Microcapsules have been designed to allow the slow release of pharmaceutical preparations, cosmetic products and food products such as flavoring agents. The microcapsules used in the present invention on the other hand, are adapted to contain materials that interact indirectly with the environments in which they are used. Microcapsules are prepared according to known procedures. The material which makes up the microcapsule wall can be chosen from a wide variety of materials. The choice of materials depends primarily on the physical and chemical characteristics of the contents, and on the intended use of the microcapsules. The microcapsules should also be readily coatable with the metal oxide gel.

Preferred microcapsule forming materials include various thermoplastic materials, such as natural or synthetic fatty alcohols, fatty acids, fatty esters and waxes. Natural waxes include the vegetable waxes such as carnuba, cauassu, candelilla, farria, palm, esparto, sugar cane and cotton waxes; animal waxes such as beeswax, ghedda, chinese insect, shellac, spermaceti and lanolin waxes; and mineral wax such as paraffin, microcrystalline, ozokerite, montan and syncera waxes. Synthetic and modified waxes useful as microcapsule forming materials include the Carbowaxes, Abril waxes, Armid and Armowaxes (Armour & Co.) and Chlorax chlorinated paraffin wax (Watford Chemical Co.). It will be appreciated that waxes are a mixture of various components, and that each type of wax is itself available in a number of different grades. Other thermoplastic materials are described as useful as microcapsule wall-forming materials, including polyethylenes such as POLYWAX™ from Petrolite, Inc. (actually it is a polyoxyethylene polymer), polypropylenes, polyesters, polyvinyl chlorides, tristarch acetates, polyethylene oxides, polypropylene oxides, polyvinylidene chloride or fluoride, polyvinyl alcohols, polyvinyl acetates, polyacrylates, polymethacrylates, vinyl functional polymers, urethanes, polycarbonates, and polylactones. Further details on microencapsulation are found in U.S. Pat. Nos. 5,589,194 and 5,433,953.

A colloid is a suspension in which the dispersed phase is not affected by gravitational forces, due to the dimensions of the dispersed phase (1–1000 nm). A sol is a colloidal suspension of solid particles in a liquid. A gel can be considered to be the agglomeration of these particles into a structure of macroscopic dimensions, such that it extends throughout the solution. It is therefore, a substance that contains a continuous solid skeleton enclosing a continuous liquid phase. Generally, chemical processing of the gel precursors involves hydrolysis and condensation reactions in which the ligands of the precursors are replaced by bonds to the ligands of other metal or metalloid elements. This process results in a growing network of metal or metalloid elements linked together, eventually forming a gel.

Gelatin is an animal-derived protein that finds a wide array of food, pharmaceutical, photographic, and technical applications. It has been used to manufacture various types of capsules for more than a hundred years, and those capsules have been utilized in a wide variety of industrial and commercial applications. Softgels (soft gelatin capsules) are a common dosage form for the administration of liquid, semi-solid and solid fills, and soft gelatin capsules embody a distinct classification of properties within the gelatin art. The typical softgel manufacturing process uses the rotary die encapsulation system, and such a general manufacturing process is described by Wilkinson, P. K. and Hom, F. S., 1990, "Softgels: manufacturing considerations." In: Specialized Drug Delivery Systems, P. Tyle (Ed.), pp. 409–449, Marcel Dekker, Inc., New York.

The primary components of the conventional capsule shell are gelatin, plasticizers and water. Several other minor shell additives may be present, such as coloring, opacifying, flavoring and antimicrobial agents. Extenders have been used in gelatin shell compositions to reduce the cost of materials within the shell and adjust the physical or chemical properties of the shell. Gelatin is manufactured by controlled hydrolysis of collagen, which is present in the bones, skins, and white connective tissues of animals. Gelatin obtained from acid hydrolysis of collagen is known as Type A gelatin, whereas gelatin obtained from alkali hydrolysis of collagen is known as Type B gelatin. Commercially, the primary raw materials for gelatin manufacturing are pigskins, and bones and skins from bovine animals. The softgel industry mainly uses gelatin derived from bovine bones.

U.S. Pat. No. 3,959,540 discloses an outer coating made of an acrylic polymer that renders softgels resistant to gastric juices and suitable for enteric release. The gelatin capsules comprise three layers: an inner gelatin shell, an intermediate layer comprising a cationic polymerizate of di-lower alkylamino lower alkylmethacrylate, and outer gastric juice resistant coating of an anionic polymerizate of methacrylic acid and acrylic acid esters.

Coating of softgel capsules with an acrylic film that possesses enteric release properties also is discussed by Felton, L. A., Shah, N. H., Zhang, G., Infeld, M. H., Malick, A. W. and McGinity, J. W. 1996. "Physical-mechanical properties of film-coated soft gelatin capsules." International Journal of Pharmaceutics, 127:203–211. The article describes that storage at low relative humidity causes an increase in the Young's Modulus for the capsules over time.

U.S. Pat. No. 4,816,259 discloses the application of a hydroxypropyl methylcellulose subcoating to the outer surface of a softgel. This subcoating improves the mechanical strength of the capsule and the capsule surface adheres better to known enteric coating compositions.

U.S. Pat. No. 4,350,679 discloses the application of a carnauba wax coating on a softgel. The functionality of the wax coating is to improve shell strength and moisture resistance.

U.S. Pat. No. 4,055,554 discloses the use of chemically modified dialdehyde polysaccharides as gel strength enhancers for gelatin compositions. Such compositions may be used for manufacturing capsules.

U.S. Pat. No. 4,804,542 discloses a softgel wherein the capsule shell contains (at least 1% by weight) an additive capable of absorbing water in an amount of at least 10% by weight of its own weight. Such additives include starches, starch derivatives, celluloses, cellulose derivatives, and milk powder. Some non-hygroscopic materials such as mono-, di-, and oligosaccharides, lactose, magnesium trisilicate, and colloidal silica also are described as useful.

U.S. Pat. No. 5,554,385 discloses a softgel wherein the dry capsule shell is comprised of 3–60% starch having a high amylose content. This invention involves preparation of gel mass by combining gelatin, high amylose starch, plasticizers, water, and other minor additives. The gel mass is then processed with the rotary die encapsulation machine to manufacture softgels. The capsules of this invention have textured frosted or satin finish. Microcapsules incorporating a flavor or fragrance compound are useful to provide a controlled release of the contained flavor or fragrance. Such products may be used in the food processing industry, where encapsulated flavor particles may provide a flavor burst upon chewing the food or may allow taste evaluation of a botanical or food/beverage aroma. Such products may also be used in the cosmetic and toiletry industries, where encapsulated fragrance particles may provide a burst of scent upon capsule fracture. The capsule may comprise a shell surrounding a core material in which the flavor or fragrance compound is contained.

Microcapsules may be formed by a coacervation or crosslinking process, in which lipids are coated by tiny droplets of proteins, carbohydrates, or synthetic polymers suspended in water. The process of coacervation is, however, difficult to control and depends on variables such as temperature, pH, agitation of the materials, and the inherent variability introduced by a natural protein or carbohydrate.

In the manufacture of microcapsules containing a flavor or fragrance compound, several features are desirable. It is desirable to produce microcapsules that have strong walls and that do not agglomerate. It is desirable that the compound be readily loaded into an oil microparticle, that is, be readily absorbed into the oil core of the microcapsule. Once absorbed, it is also desirable that the compound be irreversibly retained in the oil core of the microcapsule, that is, be adsorbed into the microcapsule.

The amount of compound that may be encapsulated depends upon several factors including its solubility in a fluid such as a gas or water, partition coefficient, molecular weight, water content, volatility, and the ratio of blank capsule to water amounts. Flavors and fragrances may be mixtures of hundreds of components, each of which may vary widely in these properties. A flavor or fragrance compound that is lipophilic may be readily contained in an oil core of a microcapsule, while a flavor or fragrance compound that is hydrophilic may be less readily contained in an oil core. For example, the flavor compound diacetyl (DA) is about 20% to about 30% water-soluble. For diacetyl, typical maximum absorption into an oil is up to only about 55%. A highly water-soluble compound such as diacetyl is also more difficult to retain in the oil core once it is loaded.

A compound's solubility in an aqueous phase versus an oil phase is determined by its partition coefficient, abbreviated as K. The partition coefficient of a compound is the ratio of the compound's concentration in one liquid phase to the compound's concentration in another liquid phase ($K_{liquid/liquid}$) or in one gaseous phase to another liquid phase ($K_{gas/liquid}$). The partition coefficient thus is an inherent property of the compound with two given liquid phases, such as a lipid phase and an aqueous phase, or a lipid and a gas phase, and reflects the compound's distribution at equilibrium between the water or gas phase and the lipid phase. Any means of decreasing the water solubility of a compound will shift the equilibrium of the compound and thus shift its partitioning between an aqueous or gas phase and a lipid phase. For example, addition of a salt will decrease the water solubility of a compound and will increase its partitioning into the lipid phase. Similarly, crosslinking a protein membrane to strengthen the membrane and physically decrease the amount of water, or physically removing water from the environment, causing capsule wall or membrane shrinking, will decrease the water solubility of a compound and will increase its partitioning into the oil phase.

Flavors or fragrances that are water soluble may interfere with encapsulation of an oil particle. For example, flavor or fragrance compounds that are water soluble cannot be encapsulated using gelatin coacervation. This is because for coacervation to occur, there must be a droplet to coat, and for these water soluble materials, there are no droplets to coat. In addition, the water soluble flavor or fragrance may partition so as to locate the flavor or fragrance compound in an aqueous environment outside the encapsulated oil particle rather than inside the oil particle. If a flavor or fragrance compound is too water soluble, the coacervation process ceases to function due to the colloid becoming either too thick or too thin. A colloid that is too thick has no flow, and thus cannot properly coat the oil surface. A colloid that is too thin is not retained on the oil surface. In the extreme, a water-soluble flavor or fragrance compound can totally solubilize the colloid, leaving no wall material to deposit on the oil surface.

Besides water solubility, a flavor or fragrance compound that contains fatty acids affects the pH of a coacervation reaction. If a base is added in an attempt to adjust pH, the fatty salts produced in the reaction impart an undesirable soap taste to a flavor compound. If a flavor or fragrance compound contains water-soluble esters, the coacervation temperature is affected and hence the final gelation temperature is altered. While it is therefore desirable to limit compounds that contain either fatty acids or water-soluble esters, there is a tradeoff in the potency and profile results for the encapsulated compound. This limits the range of formulations that are able to be effectively encapsulated.

U.S. Pat. No. 6,103,269 describes an active compound-containing powder, granule or pellet, comprising a dispersion of at least one active compound or active compound having poor absorbability in vivo in a matrix which essentially includes a structure-forming agent comprising hydrophilic macromolecules which are selected from the group consisting of collagen, gelatin, fractionated gelatin, collagen hydrolyzates, succinylated gelatin, plant proteins, plant protein hydrolyzates, elastin hydrolyzates, and mixtures thereof, which is prepared by a process that comprises the step of: a) dissolving a structure-forming agent comprising hydrophilic macromolecules selected from the group consisting of collagen, gelatin, fractionated gelatin, collagen hydrolyzates, succinylated gelatin, plant proteins, plant protein hydrolyzates, elastin hydrolyzates, in an aqueous or aqueous-organic solvent; b) dispersing the active compound and c) adding the mixture of dissolved structure-forming agent and dispersed active compound dropwise to a deeply-cooled, easily evaporable liquid and thus forming powders, granules or pellets, and d) drying the powders, granules or pellets thus formed by evaporation or sublimation of the solvent in a customary manner until the solvent is removed.

U.S. Pat. No. 6,066,613 describes large hydrogel particles suspended in an aqueous medium and to a continuous extrusion/mixing process for making this kind of hydrogel particles. The hydrogel particles comprise two different high molecular weight polymers. One is insoluble in the said aqueous medium and is used for network formation and gel integrity. The other is soluble in the said aqueous medium and helps control gel swellability and gel strength. Water insoluble materials are entrapped or encapsulated inside the network formed by these two polymers and are able to be more efficiently delivered from the aqueous composition (e.g., liquid cleanser containing the hydrogel particles). Gel particles with controllable size and controllable gel strength are prepared simply by first adding (e.g., injecting) an aqueous solution containing the said two polymers and the water insoluble material into the said aqueous medium to form elongated soft polymer gel noodles; and the noodles are then cut/broken (e.g., through mixing or mechanical agitation) into desirable gel particle size. These hydrogel particles are synthesized and supported in the aqueous medium.

BRIEF DESCRIPTION OF THE INVENTION

The present invention describes a method of forming self-sustaining particles that comprise a hydrophobic (oleophilic) phase in particulate form, with no need for a rigid shell to encapsulate the phase, and usually with no shell present. The oleophilic phase contains a gelation agent, and preferably an organogelation agent. The particles may be stored alone or in a minor amount (e.g., less than 40% by volume) of water, soapy water, and even organic carrier liquids without dissolution) to assist their stability and act as a barrier against their coalescence. These water-separated compositions do not have to be dispersions or suspensions, but may be merely particles in an aqueous storage environment. The particles themselves have prolonged stability and can be readily, simply, and inexpensively formed. A simple method of manufacture comprises forming a solution of the ingredients (e.g., at least the oleophilic material and gelation agent) at a temperature above their gelation temperature, forming droplets of the solutions, and cooling the droplets to form the particulates, Cooling may be effected by exposure to ambient conditions (e.g., room temperature) when the ingredients are properly selected, or an actual cooling environment may be needed.

DETAILED DESCRIPTION OF THE INVENTION

For purposes of the present invention, the following definitions are used.

"gel" means a mixture of a solvent and solid material network (such as a solid network of particle network, fibroid network, reticulated network, and the like) wherein the solid material (e.g., any solid such as a waxy material, polymeric material, sintered or fused particle material, or any other solid material that forms a physically supportive network for the other component) is formed through physical aggregation of the solid material through any associative means. For example, waxes may solidify in strands or adhered particles, as may polymers, wherein polymer chains may also associate through hydrogen bonds or other bonds of comparable strength. All that is needed is for association of the solid phase in forming a network. The gel may comprise a solid network supporting a liquid medium or a solid network supporting a solid medium, with the solid network differing from the solid medium. The solid medium will usually, but not always, be a lower melting temperature material.

"hydrogel" means a gel in which the solvent (diluent) is water;

"organogel" means a gel in which the solvent (diluent) is an organic carrier or organic solvent (as opposed to water);

"thermoreversible organogel" is synonymous with "physical organogel" and means an organogel whose network structure is due to weak, thermally unstable bonding such as hydrogen bonding (as opposed to strong, thermally stable bonds such as covalent bonds) and can, therefore, be heated to a free-flowing, liquid (molten) state. (Upon cooling below a characteristic temperature ($T_{gel}$), the bonds reform and the solid-like gel structure is re-established.);

One aspect of the invention is a particulate product and process for making that particulate product. The particle product may be described from one perspective as a stable particle of from 0.05 to 10 millimeters in average diameter. The particle comprises a mixture of a material that is an oleophilic liquid at 75° C. and a gelation agent. The gelation agent is a solid at 25° C. The proportions of the gelation agent to oleophilic liquid may be, for example, between 0.05% to 70% by weight gelation agent to oleophilic liquid. The solidification temperature or the $T_{gel}$ of the mixture or gelation agent may be at or above 25° C.

A stable bead or particle of from 0.05 to 2, 5 or 10 millimeters in diameter comprises a mixture of a material that is an oleophilic liquid at 25° C., 50° C., or 75° C. and a gelation agent or organogelation agent, the proportions of the gelation agent to oleophilic liquid being between 0.05% to 30% by weight gelation agent to oleophilic liquid, the $T_{gel}$ of the mixture being above 25° C. There may have the gelation agent comprise an organogelation agent, which is a term understood in the art and further defined herein. The bead or particle may provide the oleophilic material liquid (or solid) as an oil or oil solution. The bead or particle may be stored in a dispersing or non-dispersing aqueous carrier comprising 0–98%, 0–90%, 1–90%, 2–90%, 2–75%, or 2–50% by weight of the beads as is convenient to the user. A group of beads may have an average diameter of between 0.05 to 10 millimeters, between 0.08 and 10 millimeters, between 0.08 and 5 millimeters, between 0.1 and 5 millimeters, between 0.1 and 2 millimeters, and 0.1 and 1 millimeters and the proportions of the gelation agent to oleophilic liquid may be, for example, between 0.5% to 20% or more by weight gelation agent to oleophilic liquid.

The $T_{gel}$ of the mixture or the $T_{gel}$ of the individual components refers to the temperature at which the composition gels from an essentially liquid state as the temperature drops, or the temperature at which an individual component gels when the temperature of a liquid component is dropped.

A method of forming such a stable bead may include:
a) mixing together at least the oleophilic liquid and the gelation agent,
b) providing the mixture as a fluid material (having liquid or flowable properties), the mixture being at a temperature at least 5° C. above the solidifying temperature, such as at least 5° C. above the $T_{gel}$ of the mixture and/or the gelation agent;

c) forming droplets, pastilles, strands, particles, shapes, or other solid accumulations or gels of the material (preferably a fluid material); and d) cooling the solid accumulation (e.g., droplets, strands, particles, shapes, etc. to a temperature at or at least 5° C. below the solidification temperature of the gelation agent of the $T_{gel}$ of the mixture or gelation agent or at any other temperature that causes gelation) to form solid stable particles or beads.

There may be other effects and materials provided at various stages of the formation. For example, various ingredients may be chilled while others are heated, there may be stirring, shearing forces, sonic stirring, coupling agents, surfactants, film-forming agents, and other active ingredients in the formation process.

The precise process and phenomena that contribute to the formation of the particles or beads, and the precise structure of the particles and beads may vary between different combinations of materials, and even between different proportions of the same materials. It is believed that at least one of the following three systems and processes occur during the practice of the present invention, although these descriptions and/or hypothesis are not intended to be limiting on the scope of actual processes and structures that are provided in the practice of the present invention. The first description is where the two organic materials (the oleophilic agent and the gelation agent) are provided as a mixture at a temperature at which both materials are together as a fluid (e.g., preferably as a true liquid, but at least in a form that is flowable and in which the at least two ingredients are intimately mixed). This temperature usually requires that the softening temperature and/or the flow temperature or melt temperature (e.g., $T_{g1}$ and/or $T_{g2}$) be exceeded. After the fluid and the intermixed components have been provided at this elevated temperature (e.g., at a temperature above 25° C., above 40° C., above 50° C., above 60° C., above 75° C., above 85° C., above 100° C., above 120° C., above 150° C., above 175° C., and the like, up to temperatures short of where the individual components boil or decompose), the composition is cooled. The cooling temperature, depending upon how low a temperature to which the mixture is dropped, will cause at least one or both of the at least two ingredients to solidify. This cooling is done while the mixture is in or being placed into particulate form, as by prilling, pastilling, spray drying (or spray cooling in this case), or any other particle or bead forming process. Because the at least two materials are intermixed, as opposed to the encapsulating relationship found in microencapsulation processes, as the first or both at least two materials (the oleophilic agent and the gelation agent) harden or solidify, they remain intermixed. It is particularly at this point that the nature of the particle or bead forming phenomenon becomes alternative in nature. The gelation agent, in some circumstances is believed to form fibroids, tendrils, fibers, reticulated structures, elongate elements or the like (e.g., with aspect ratios of at least 3, aspect ratios of at least 4 or 5, and higher, up to continuous filamentary elements with extremely high aspect ratios) within the particle or bead material (e.g., within a droplet). These various structural elements form a physical support for the oleophilic material, whether supporting the oleophilic material by surface tension to the solid, adsorption to the solid, partial entrapment by the solid, entrapment by the solid, partial absorption by the solid, or by any other physical or physical chemical means by which the solid material supports and maintains a particulate shape for the at least two materials. A second method of stable particle, bead or droplet formation may occur where the structural elements may even be particulates without elongate structure (e.g., aspect ratios between 1 and 3, or between 1 and 5), wherein the physical forces between the particles and the oleophilic agent sustains the particle, bead or droplet structure. The particles may or may not be in contact with each other and may or may not be bound by physical or chemical means to each other during the gelation or solidifying process, but they do provide actual support for the particle, bead or droplet structure so that the product exists as a stable particle. A third phenomenon by which particle stabilization or gelation maay occur is with the formation of a gradation of materials within the particle, with the highest concentration of the gelation agent at the surface of the droplet and the least concentration of the gelation agent (yet still above 0.0) occurring at center of the particle. This is not traditional encapsulation or microencapsulation where there is a clear distinction and sharp separation between a shell (solid) and a core (liquid). The gradation may have the outermost surface of the particle as 100% gelation material (and entrapped solids or intended diluents or active ingredients), but may also have 99%, 95%, 90%, 80%, 75%, 50%, 40%, 35% 30% or the like of gelation agent in the outermost surface and lower amounts within the body of the particle, the remainder of the concentration being provided as the oleophilic material and its associated components.

As noted above and later herein, a preferred aspect of the invention uses a gelation agent that is a solid at 25° C. to stabilize an oleophilic fluid, flowable or liquid material. The oleophilic material may also be a solid or difficult to flow material at 25° C., so that the particle may even be a solid oleophilic material in a solid matrix or network of solid supporting elements or gelation agent. The solid network of gelation agent may have provided structural support for the oleophilic material during the solidification process and remains as a network after the cooling of the oleophilic material to a solid. The final stable particle may therefore be a support system of the gelation agent and a liquid or semisolid or solid oleophilic material; in particle form. It must be noted again, that the term particle generically refers to a bead, pastille, solid droplet, fibroid, sphere, oblong, filamentary object, reticulated network, or other solid form with the required maximum diameter of 10 mm or less. The average diameter may be based upon number average diameter or any other basis as desired.

According to the present invention, molten (liquid) organogels are formed into any solid accumulation of materials such as droplets, particles, pastilles, strands, fibroids, from liquids provided above their gelation temperatures ($T_{gel}$). As is understood in the art, the $T_{gel}$ is the temperature at which gel-to-sol transition occurs. It is preferred that the $T_{gel}$ of the molten compositions be about between 20° C. and 70° C. when used to form the solid accumulations in forming the beads or particles or the invention. It is also preferred that the molten coating compositions be coated from about 5° C. to 25° C. above the $T_{gel}$ of the composition.

The particle-forming compositions of the invention may also form thermoreversible gels, although any type of gel formation may be used. Generally, a thermoreversible organogel is characterized by the observation of a $T_{gel}$. The $T_{gel}$ may be determined by several different criteria, such as, for example, the temperature at which: (a) when a liquid composition is cooled, there is a rapid, discrete, qualitative change from liquid to solid properties; (b) when a liquid composition is cooled, there is a sudden increase in hydrodynamic radius, as measured by dynamic light scattering methods; (c) when a liquid composition is warmed, a 1 mm drop of mercury will flow through the composition; and (d) the elastic and viscous moduli are equivalent.

As noted above, the beads or particles (used to generically encompass the particles of the invention, whether they are beads, strands, particles, shapes, fibroids, filamentary shapes, pastilles or any other solid accumulation) are formed from two distinct materials that may be present as two distinct phases. The two distinct materials comprise what are referred to in the practice of the invention as the organic solid network, and the other component is referred to as the oleophilic liquid, oleophilic material or generally as the oleophilic organic medium. It may be difficult at times to distinguish which material is apparently working at the various function because of the dimensions and intimacy of the materials. For example, two phase or multiphase systems may form, or what is generally referred to as interpenetrating networks, where the functions of the materials, particularly where both materials may be present as solids, cannot clearly be defined or distinguished as a supporting, carrier, or supported phase. Even where a solid organic network is supporting a liquid organic medium, chilling the particle so that the liquid organic medium solidifies does not remove the particle from the practice of the invention. The gelation agent or organic solid network may be any organic material that passes from liquid to solid state during the cooling process and with its solid structure supports the other organic medium. The organic solid medium may comprise organic materials that are solids at the cool-down temperature, organic or inorganic waxes, polymers, copolymers, oligomers, and the like. The term gelation is used, rather than some other term, because the process appears to act in the manner of a gel-forming process, and many of the beads or particles appear to act as gels, rather than solid particles.

The nature of some of the compositions, such as those that can be defined according to standards in the art as thermoreversible gels, are clearly gel and gelation compositions. Non-limiting examples of liquid compositions that form thermoreversible organogels at or near room temperature are amine-substituted polystyrene in tetrahydronapthalene; vinylidene chloride/methyl acrylate copolymers in benzene, toluene, chlorobenzene, m-dichlorobenzene, or o-dichlorobenzene; acrylonitrile/vinyl acetate copolymers in dimethylacetamide; poly(vinyl chloride) in dioctyl phthalate or dibutyl phthalate; poly(acrylonitrile) in dimethylformamide or dimethylacetamide; nitrocellulose in ethyl alcohol; and poly(methyl methacrylate) in N,N-dimethylformamide; and poly(vinyl butyral) in toluene, methyl ethyl ketone, acetone, tetrahydrofuran, 1,4-dioxane, and blends thereof.

Especially preferable thermoreversible gels for use in the present invention are gels of poly(vinyl butyral) in mixtures of toluene and 2-butanone, i.e., methyl ethyl ketone or MEK. Although not wishing to be bound by theory, Applicants postulate that thermoreversible organogels suitable for use in the present invention may contain a polymer or copolymer wherein the polymer or copolymer chain contains two or more different functional groups or discrete regions, e.g., syndiotactic sequences prone to crystallite formation in a solvent or solvent mixture. It is believed that the addition of methanol or other alcohols to poly(vinyl butyral) prevents or reverses gel formation because of the hydrogen bonding of the poly(vinyl alcohol) sites of poly(vinyl butyral) with alcohol-based solvents.

Organogels of poly(vinyl butyral) may be prepared by combining poly(vinyl butyral) polymers preferably having a high hydroxyl content with an appropriate solvent blend. Non-limiting examples of useful poly(vinyl butyral) polymers include Butvar™B-72, Butvar™B-73, Butvar™B-74, Butvar™B-90, and Butvar™B-98 (all available from Monsanto Company, St. Louis, Mo.). Especially useful are Butvars™ which have a poly(vinyl alcohol) content of from about 17.5 to 21.0 weight percent. The requirements of the solvent blend are that it must not interact with poly(vinyl alcohol) sites along the polymer chain and thereby interfere with the polymeric binder's ability to undergo hydrogen bonding with itself through the hydroxyl groups, yet it must solvate the polymer at the non-hydroxyl sites and be an overall solvent for the polymer at temperatures above $T_{gel}$. A further requirement is that upon cooling below $T_{gel}$ the polymer remains in solution forming a gel that is a homogeneous, clear, solid solution as opposed to forming an opaque heterogeneous mass.

In using molten thermoreversible organogel solutions, it is necessary to form the particles at temperatures above the $T_{gel}$ of the organogel. On the other hand, it is desirable to perform the processing at the lowest possible temperature above $T_{gel}$ in order to facilitate rapid onset of gelation after forming. It has been found advantageous to provide a "chill-box" or similar rapid chilling mechanism which functions immediately after the forming operation to trigger rapid gelation to inhibit interlayer mixing. Preferably, the molten organogel temperatures during forming should be 5° C. to 25° C. above $T_{gel}$. More preferably, the molten organogel temperatures during coating should be from about 10° C. to about 15° C. above $T_{gel}$.

The coating solutions or dispersions are solidified organogels at or near room temperature and liquids at a modestly elevated temperature. The solutions are warmed to 5° C. to 25° C. above their $T_{gel}$ so that they are liquids. The molten solutions are spray dried, prilled, pastilled, dispersion solidified, drip-dried, spray extruded, or as known by those of ordinary skill in the art to be otherwise formed into a solid bead or particle by being cooled below their gel temperature while in particulate or droplet form.

The term "PLURONIC™" refers to poloxamer compounds useful as gelation agents and which are sold collectively under the trademark PLURONIC™ (BASF, Parsippany, N.J.). PLURONIC F-127 (PL 127) corresponds to poloxamer 407, a polyoxypropylene-polyoxyethylene block copolymer described by Schmolka in the Journal of Biomedical Materials Research 6:571–582, 1972. Other PLURONIC™ compounds may be used in the present invention. As used in this application, the terms PLURONIC™ organogel, poloxamer organogel, and polyoxyethylene/polyoxypropylene organogel are synonymous.

Abdallah, David J. and Weiss, Richard G. in "The Quest for the Simplest Possible Organogelators and Some Properties of their Organogels," *J. Braz. Chem. Soc.*, Vo. 11, No. 3, 209–218, 2000 describe the nature of organogels, organogelators, and lists many low molecular-mass organic gelators (LMOG's) and the nature of their properties. Among the preferred classes of materials are the aromatic-linking-steroidal (ALS) class of LMOGs, particularly those with the aromatic function being contributed by 2-substituted-9,10-anthraquinones, cinnamate, phenazine, N-substituted-analines, 2-naphthyl, 1-pyrenyl, and p-substituted phenyl groups. They also determined that some classes of aromatic-linked-aromatic groups also function as LMOGs. The classes and lists of organogelators described therein are incorporated herein by reference.

Other non-limiting examples of gelation materials include waxes (e.g., beeswax, paraffin, water-insoluble wax, carbonbased wax, silicone wax, microcrystalline wax, etc.), triglycerides, acid triglycerides, polymers, fluoroalkyl (meth)acrylate polymers and copolymers, acrylate polymers, ethylene/acrylate copolymers, polyethylene, polypropylene polymers and copolymers, fatty acids, fatty alcohols, fatty acid esters, fatty acid ethers, fatty acid amides, alkylene polyhydric alcohols, fatty acid amide of an alkanolamine, glyceryl monostearate, (aryl-substituted) sugars, dibenzyl sorbitol (or mannitoal, rabbitol, etc.), condensates and precondensates of lower monohydric alcohols, trihydroic alcohols, lower polyglycols, propylene/ethylene polycondensates, etc.

The particles may be used in a wide range of products, as mentioned above, and includes also such diverse products as agricultural products (herbicides, pesticides, nutrients, fertilizers, delayed release materials, etc.), personal care products (shampoos, creams, skin cleansers, eye make-up, rinses, conditioners, soaps, toothpastes, etc.), health products (sunscreens, moisturizers, antiblistering agents, antiinflammatants, pain-relieving agents, antitoxic agents, neurologic agent delivery, etc.), testing products (analyte testing agents, pH testing agents, iron testing compositions, blood sugar-testing compositions, and the like).

The composition of the organogel particles of the present invention will comprise free-flowing particles of less than 5 or 10 millimeters having from 0.5% to 30% by weight, 0.5 to 75% by weight, or 0.5 to 50% by weight of gelation agent and from 25 to 99.5% by weight, 70 to 99.5% by weight solid or liquid oleophilic composition, organic material or solid medium. The oleophilic material may be any oleophilic material, whether a single pure compound, a solution, a composition, a mixture, an emulsion (e.g., an oil-in-water emulsion or preferably a water-in-oil emulsion), a dispersion, or the like. Among the many types of oleophilic materials may be included oils, essential oils, emollients, natural oils, synthetic oils, oil esters, medications, fragrances, cosmetics, astringenets, wound-healing promotion agents, cells, pharmaceuticals, colorants, repellants, antioxidants, enzymes, curing agents, solvents, attractants, medications, taggants, markers, tracing agents, antifungal agents, antibiotics, dispersants, ultraviolet radiation absorbing compositions, flavoring agents, toners, exfoliating compositions, and the like. As noted the general range, when considering two phases, ranges from about 0.5% to 70% by weight of gelation agent and from 70 to 99.5% by weight liquid oleophilic composition. Alternative ranges of the gelation agent are from 1–60%, 1–50%, 1–30%, 2–25%, 5–25%, 7–25%, 10–25%, and 12–20% by total weight of the particle or by weight of the hydrophobic liquid. At the higher levels of gelation agent (e.g., from 12%–30%, greater than 15%, and from 15–30% by weight), the particles tend to be gelled more firmly, are very stable, and need not be stored in water to maintain the individual particles and reduce their coalescence. The amount of water used to assist in maintaining the particles or gel beads in their most stable storage format ranges from about 1–2% by weight of particles as a water phase that coats the particles, up to 50% or more by weight of water. Again, it must be emphasized, that with many of the particle sizes of the invention, these materials are not dispersions of particles in an aqueous phase, but are merely particles blocked from physical contact from each other by a water phase, with the particles (depending upon their specific gravity) sinking or floating in the aqueous medium.

The useful oils may be provided as purified or more raw oils, and may comprise any organic or inorganic oil, preferably triglycerides, and may include all of the know vegetable or essential oils. Non-limiting examples of such oils wood include safflour oil, sunflower oil, canuba oil, corn oil, peanut oil, kneedsfoot oil, pine oil, lilac oil, fish oil, polar oils, non-polar oils, synthetic oils, natural oils, jojoba oil, and the like. These oils may be pure, raw, may contain dispersed materials or may have suspended or dispersed materials added to the oil. For example, abrasive particles may be suspended to provide scrubbing or exfollient effects, silica, titania, calcium carbonate, talc, starch, pigments, conductive particles, reflective particles, frangible particles, reactive materials, moisture sensitive particles (e.g., urea particles, zeolites, gas-generating particles), and the like. Other forms of active or assistive ingredients are described elsewhere. The concentration of such materials may be from 0%, 0.001% to 20% or 40% of the hydrophobic component.

The organogel particles, as noted above, should have a particle size that is 2, 5 or 10 millimeters or less, usually from 0.05 mm to 2 mm or 5 mm, or from 0.05 mm to 1 mm, or from 0.1 mm to 2 mm. The particles may be readily manufactured by standard particle forming processes such as prilling, pastilling, dispersion condensation, spray drying processes, or any other particle forming process known in the art, and with proper control, filtering or size control processes such as that shown in copending U.S. patent application Ser. No. 09/945,889, filed Sep. 4, 2001 may be provided with very narrow size distributions. Larger particles that have clumped or formed a large mass may be sheared, crushed, or otherwise diminished in size.

The process of manufacture is extremely cost efficient and requires minimum capital investment. The ingredients may be mixed, blended, stirred or associated by any convenient means at a temperature above the gelation point (temperature of gelation as described above). After the materials have been thoroughly mixed, preferably to a point of molecular mixtures or solutions, at a temperature above the temperature of gelation for the particular combination and proportions of ingredients, the composition (preferably referred to herein as a solution) is then formed into droplets and cooled while in droplet form. This is conveniently done by heating a batch of the solution, and spraying the solution through a spray head or other droplet dispersing element to form droplets. The droplets are sprayed or dropped, or otherwise directed into an environment that is below the temperature of gelation for the solution or emulsion. It is preferred that the environmental temperature is at least 5° C. below the $T_{gel}$, although larger temperature differences from the are desirable, such as at least 10° C. below the $T_{gel}$, at least 15° C. below the $T_{gel}$, and at least 20° C. below the $T_{gel}$, or at least 25° C. below the $T_{gel}$ are particularly useful. It might be undesirable to inject droplets into an environment that is so cold (e.g., into liquid Nitrogen) where the materials of the composition would freeze to rapidly to allow for gelation, although upon warming up to a temperature that is still below the $T_{gel}$, the solution would then be warm enough for gelation to occur. These temperatures may range from just above the gelation temperature to just below boiling temperatures for the composition or for individual ingredients, such as the oleophilic material.

Various other ingredients, some of which have been noted above, may also be included within the solution prior to being formed into droplets. Such additional ingredients include (a) a wax or wax mixture of about 1 part by weight mineral ester wax having an acid value of about 0 to about 55, about 4 parts by weight partly saponified mineral ester wax having an acid value of about 10 to about 45, about 1.5 parts by weight insect wax having an acid value of about 0.2 to about 24; (b) a film-forming agent that is a curable material selected from the group consisting of a curable emulsion polymer, a curable resin, a curable aminofunctional silicone, and mixtures thereof, (c) a film-modifying agent that is a surfactant selected from the group consisting of a surface-active aminofunctional silicone, a linear arylalkyl modified polydialkyl siloxane, a linear alkylated copolymer of vinylpyrrolidone with a long chain ($C_{12}$ to $C_{22}$) alpha olefin, and mixtures thereof; (d) a nonionic emulsifying agent having an HLB* value of about 10 to about 15 and, for example, selected from the group consisting of an oil-soluble polyglycerol ester of a hydrophobic fatty acid capable of forming a water in oil emulsion, a water-soluble $C_8$ to $C_{18}$ alkylphenol ether with ethylene oxide having an average number of ethylene oxide units of of about 5 to about 70, and mixtures thereof (*HLB-hydrophile-lipophile balance); (e) an effective amount of an anionic oleophilic dispersing agent; (f) a thickening agent selected from the group consisting of polymers, colloids, alkaline earth metal aluminum silicate, non-ionic, cationic or anionic esters, and mixtures thereof, (g) an organic solvent selected from the group consisting of a liquid aliphatic hydrocarbon, a liquid aromatic hydrocarbon, and an oleoresinous liquid having an average kauri-butanol value above 50, and mixtures thereof; and (h) an effective amount of a preservative.

The properties of the particles may be controlled by various disciplines and additives as desired. The size can be controlled by the size of spray heads, the degree of shearing forces, the temperatures of the initial gel solution, the gelation rate, the viscosity of the gel composition, and other physical mechanisms. The size may widely range, with specific ranges of 10 micrometers to 4,000 micrometers being generally useful, but with ranges between 10 and 2,000 micrometers, 10 and 1000 micrometers, 50 and 2000 micrometers, 50 and 1500 micrometers, 50 and 1000 micrometers, 100 to 2000 micrometers, 150 to 2000 micrometers, 100 to 1000 micrometers, 200 to 2000 micrometers, and 200 to 1500 micrometers, 200 to 1000 micrometers, and intermediate ranges.

The strength of the capsules can also be controlled at the desire of the manufacturer of the organogel particles. The way in which the strength can be measured may vary depend on the needs of particles. For example, strength may be measured as ability to resist shear forces, as when two surfaces are moved in opposite directions while in contact with the particles, exhibiting shear strengths at least 5 times greater than water, preferably at least 100 times greater than water, up to shear strengths of softgel capsules, 1% crosslinked gelatin capsules, 0.5% crosslinked gelatin, 90%, 80%, 75%, 70%, 65%, 60%, 50%, 40%, 30%, 24%, 20%, 15%, 10%, 5%, 3%, 2%, 1% and less of the shear strength of such crosslinked gelatins. There are more technical ASTM tests and cosmetology tests that may be used to reflect the specific strength needed, but it should be appreciated that the strength can be controlled by the exercise of reasonable judgment and selection of ingredients and proportions according to the skill of the manufacturer. Viscosity agents, thixotropic agents, surfactants, solid binders, antistatic agents, crosslinking agents, coupling agents, dispersing agents, emulsifying agents, thinning agents, and the like are among the types of additives that can be added in amounts between 0.001 and 30% by weight of the hydrophobic (oleophilic) material (e.g., the oil) to assist in the control of the properties of the organogel particles, such as size, physical strength, durability, and the like.

What is claimed:

1. A method of forming a stable particle of from 0.05 to 10 millimeters in diameter comprising a mixture of an organic material that is an oleophilic liquid at 75° C. and a gelation agent, the proportions of the gelation agent to organic material being between 0.05% to 70% by weight gelation agent to organic material, the method comprising:
    a) mixing together at least the organic material and the gelation agent,
    b) providing the mixture at a temperature wherein the mixture is a fluid or liquid;
    c) forming fluid particles of the fluid material by spraying the fluid material through a spray head; and
    d) cooling the fluid particles to a temperature so that the fluid or liquid becomes a solid or gel particle.

2. The process of claim 1 wherein the liquid or fluid mixture is maintained at a temperature at least 5° C. above the solidification temperature of the mixture as a fluid or liquid material and cooling is done to a temperature that is at least 5° C. below the solidification temperature of the mixture to form the solid stable particles.

3. The method of claim 1 wherein the gelation agent comprises an organic gelation agent.

4. The method of claim 1 wherein the solid or gel particles formed in step d) is added to an aqueous or non-aqueous carrier comprising 0.1–50% by weight of those particles.

5. The method of claim 1 wherein the particles formed in step d) have an average diameter of between 0.05 and 2 millimeters and the proportions of the gelation agent to oleophilic liquid being between 0.5% to 30% by weight gelation agent to oleophilic liquid.

6. A method of forming a stable particle of from 0.05 to 10 millimeters in diameter comprising a mixture of an organic material that is an oleophilic liquid at 75° C. and a gelation agent, the proportions of the gelation agent to organic material being between 0.05% to 70% by weight gelation agent to organic material, the method comprising:
    a) mixing together at least the organic material and the gelation agent,
    b) providing the mixture at a temperature wherein the mixture is a fluid or liquid;
    c) forming liquid particles of the fluid material; and
    d) cooling the liquid particles to a temperature so that the fluid or liquid becomes a solid or gel particle,
wherein cooling of the liquid particles in step d) causes the gelation agent to form distinct particles within the particles formed of the fluid material.

7. The method of claim 6 wherein the organic material comprises an oil that is liquid at 25° C.

8. The method of claim 6 wherein the stable particle comprises a bead and the bead has an average diameter of between 0.01 and 2 millimeters and the proportions of the gelation agent to organic material being between 0.5% to 30% by weight gelation agent to organic material.

9. The method of claim 6 wherein cooling the particles of fluid material is to a temperature at least 10° C. below the $T_{gel}$ of the mixture to form the solid stable particles.

10. A method of forming a stable particle of from 0.05 to 10 millimeters in diameter comprising a mixture of an organic material that is an oleophilic liquid at 75° C. and a gelation agent, the proportions of the gelation agent to organic material being between 0.05% to 70% by weight gelation agent to organic material, the method comprising:
    a) mixing together at least the organic material and the gelation agent,
    b) providing the mixture at a temperature wherein the mixture is a fluid or liquid;
    c) forming liquid particles of the fluid material; and d) cooling the liquid particles to a temperature so that the fluid or liquid becomes a solid or gel particle, wherein the cooling of the liquid particles causes the gelation agent to form distinct elongate elements within the particles formed of the fluid material.

11. The method of claim 10 wherein the organic material comprises an oil that is liquid at 25° C.

12. The method of claim 10 wherein cooling the particles of fluid material is to a temperature at least 10° C. below the $T_{gel}$ of the mixture to form the solid stable particles.

13. A method of forming a stable particle of from 0.05 to 10 millimeters in diameter comprising a mixture of an organic material that is an oleophilic liquid at 75° C. and a gelation agent, the proportions of the gelation agent to organic material being between 0.05% to 70% by weight gelation agent to organic material, the method comprising:

a) mixing together at least the organic material and the gelation agent, b) providing the mixture at a temperature wherein the mixture is a fluid or liquid;

c) forming liquid particles of the fluid material; and d) cooling the liquid particles to a temperature so that the fluid or liquid becomes a solid or gel particle, wherein the cooling of the liquid particles causes the gelation agent to form a network of solid gelation agent within the particles formed of the fluid material.

14. The method of claim 13 wherein the organic material comprises an oil that is liquid at 25° C.

15. A method of forming a stable particle of from 0.05 to 10 millimeters in diameter comprising a mixture of an organic material that is an oleophilic liquid at 75° C. and a gelation agent, the proportions of the gelation agent to organic material being between 0.05% to 70% by weight gelation agent to organic material, the method comprising:

a) mixing together at least the organic material and the gelation agent, b) providing the mixture at a temperature wherein the mixture is a fluid or liquid;

c) forming liquid particles of the fluid material; and d) cooling the liquid particles to a temperature so that the fluid or liquid becomes a solid or gel particle, wherein the cooling of the liquid particles or fluid mixture causes the gelation agent to form a gradation of concentration of the gelation agent within the particles, with higher concentration of the gelation agent at the surface of the particles than at the core of the particles.

16. The method of claim 15 wherein the organic material comprises an oil that is liquid at 25° C.

* * * * *